US012755915B2

(12) United States Patent
Yoneda

(10) Patent No.: US 12,755,915 B2
(45) Date of Patent: Oct. 6, 2026

(54) PROTECTIVE ELEMENT

(71) Applicant: DEXERIALS CORPORATION, Shimotsuke (JP)

(72) Inventor: Yoshihiro Yoneda, Shimotsuke (JP)

(73) Assignee: Dexerials Corporation, Shimotsuke (JP)

( * ) Notice: Subject to any disclaimer, the term of this patent is extended or adjusted under 35 U.S.C. 154(b) by 244 days.

(21) Appl. No.: 18/836,886

(22) PCT Filed: Feb. 10, 2023

(86) PCT No.: PCT/JP2023/004530
§ 371 (c)(1),
(2) Date: Aug. 8, 2024

(87) PCT Pub. No.: WO2023/157763
PCT Pub. Date: Aug. 24, 2023

(65) Prior Publication Data

US 2025/0182989 A1 Jun. 5, 2025

(30) Foreign Application Priority Data

Feb. 17, 2022 (JP) ................................ 2022-022951

(51) Int. Cl.
*H01H 39/00* (2006.01)
*H01H 37/76* (2006.01)
*H01H 85/06* (2006.01)

(52) U.S. Cl.
CPC ............ *H01H 39/00* (2013.01); *H01H 37/76* (2013.01); *H01H 85/06* (2013.01); *H01H 2039/008* (2013.01)

(58) Field of Classification Search
CPC ........ H01H 39/00; H01H 37/76; H01H 85/06; H01H 2039/008
See application file for complete search history.

(56) References Cited

U.S. PATENT DOCUMENTS 6,445,563 B1 * 9/2002 Endo .................. H01H 85/0417 361/103
2016/0343524 A1 11/2016 Gaudinat et al.
(Continued)

FOREIGN PATENT DOCUMENTS

CN 113223905 A 8/2021
JP 6433518 B2 12/2018
(Continued)

OTHER PUBLICATIONS

Written Opinion of the International Searching Authority issued Apr. 18, 2025, in PCT/JP2023/004530 (with English translation), 6 pages.

(Continued)

*Primary Examiner* — Jacob R Crum
(74) *Attorney, Agent, or Firm* — Element IP, PLC

(57) ABSTRACT

A protective element includes: a first fuse element part including a first fuse element; a second fuse element part including a second fuse element; an insulating enclosure having a fusing space in which the first fuse element is positioned and a cutting space in which the second fuse element is positioned; and a slider disposed to be movable within the fusing space toward a second fuse element side. The fusing space is divided into a first space and a second space which interpose the slider, the first fuse element being positioned in the first space, and a second space being connected to the cutting space. When a fusion current flows to the first fuse element, and as pressure in the first space rises, the slider is configured to move toward a second fuse element side such that a cutting part of the slider cuts the second fuse element.

8 Claims, 10 Drawing Sheets

(56) References Cited

U.S. PATENT DOCUMENTS

| | | | |
|---|---|---|---|
| 2016/0351363 A1 | 12/2016 | Gaudinat et al. | |
| 2017/0110280 A1 | 4/2017 | Nan | |
| 2019/0172673 A1 | 6/2019 | Yoneda | |
| 2020/0321181 A1* | 10/2020 | Mathieu | H01H 39/004 |
| 2022/0189723 A1* | 6/2022 | Shi | H01H 71/14 |
| 2023/0154714 A1 | 5/2023 | Shi et al. | |
| 2024/0258055 A1* | 8/2024 | Kondo | H01H 39/006 |

FOREIGN PATENT DOCUMENTS

| | | | |
|---|---|---|---|
| JP | 2019046767 | A | 3/2019 |
| JP | 2020161468 | A | 10/2020 |
| KR | 1020190004804 | A | 1/2019 |

OTHER PUBLICATIONS

Office Action issued May 28, 2025, in corresponding Korean Patent Application No. 10-2024-7019774 (with machine English translation), 11 pages.

International Search Report issued Apr. 18, 2023 in PCT/JP2023/004530 (with English translation), 4 pages.

* cited by examiner

PROTECTIVE ELEMENT

TECHNICAL FIELD

The present invention relates to a protective element.

The present application claims priority based on JP 2022-022951 filed in Japan on Feb. 17, 2022, the contents of which are hereby incorporated herein.

BACKGROUND ART

Conventionally, fuse elements generate heat and fuse when a current exceeding the rated value flows, thereby cutting off the current path. A protective element having fuse elements (fuse elements) is used, for example, in battery packs using lithium-ion secondary batteries.

In recent years, lithium-ion rechargeable batteries have been used not only in mobile devices, but also in a wide range of fields such as electric vehicles and storage batteries. For this reason, lithium-ion rechargeable batteries are being developed with higher capacities. Accordingly, there is a demand for protective elements to be installed in battery packs that have large-capacity lithium-ion batteries and having high-voltage and high-current paths.

As protective elements compatible with high voltage and high current (for example, 100 V/100 A or more), a trigger cutoff fuse such as pyrofuse have been adopted instead of blowing type fuse (see, for example, Patent Literature 1 below).

PRIOR ART LITERATURE

Patent Literature

Patent Literature 1: Japanese Patent No. 6433518

SUMMARY OF INVENTION

Problem to be Solved by Invention

However, with the conventional protective elements described above, the higher the voltage and current, the larger the case size and the higher the material cost, resulting in a high-cost current fuse. In addition, the past protective elements that are compatible with high voltages and large currents only cut off overcurrents, and there are none that also have a cutoff function based on a cutoff signal.

The present invention is proposed in light of these conventional circumstances and has an object to provide a protective element that is capable of handling high voltage and high current and capable of achieving both cutoff of overcurrent and a cutoff function by a cutoff signal.

Means for Solving Problem

In order to achieve the above-mentioned objectives, the present invention provides the following means.

(1) A protective element characterized by being provided with:

a first fuse element part having a first terminal and a second terminal, and a first fuse element electrically connecting the first terminal and the second terminal to each other;

a second fuse element part having a third terminal and a fourth terminal and a second fuse element electrically connecting the third terminal and the fourth terminal to each other;

an insulating enclosure having a fusing space in which the first fuse element is positioned and a cutting space in which the second fuse element is positioned, the insulating enclosure electrically insulating the first fuse element part and the second fuse element part from each other while holding the first fuse element part and the second fuse element part; and a slider positioned between the first fuse element and the second fuse element, and disposed to be movable within the fusing space toward the second fuse element side, wherein the fusing space is divided into a first space and a second space which interpose the slider, the first fuse element being positioned in the first space, and a second space being connected to the cutting space, the slider has a cutting part protruding from the second space toward the cutting space, and when a fusion current flows to the first fuse element, causing the first fuse element to fuse, an arc discharge occurs within the first space, and as pressure in the first space rises, the slider moves toward the second fuse element side and the cutting part cuts the second fuse element.

(2) The protective element according to (1) above characterized in that, after the cutting part has cut the second fuse element, the cutting part shields the cut portion of the second fuse element within the cutting space.

(3) The protective element according to (1) or (2) above characterized in that the second fuse element has a structure in which a plurality of a conductive member is stacked via an insulating member, and the insulating member is provided with a gap part corresponding to the cutting space.

(4) The protective element according to any one of (1) to (3) above characterized by being further provided with a cylindrical insulating cover that houses the insulating enclosure inside.

(5) The protective element according to any one of (1) to (4) above characterized in that the melting point of the second fuse element is higher than the melting point of the first fuse element.

Effects of the Invention

As described above, according to the present invention, it is possible to handle high voltages and large currents, and to provide a protective element capable of achieving both cutoff of overcurrent and a cutoff function by a cutoff signal.

EMBODIMENTS OF THE INVENTION

Embodiments of the present invention will be described in detail below with reference to drawings.

Note that for ease of understanding characteristics, the drawings used in the description below may schematically illustrate characteristic portions for convenience, and dimensional ratios and the like of each constituent element are not necessarily the same as the actual ratios. Furthermore, the materials, dimensions, and the like exemplified in the description below are examples, and the present invention is not necessarily limited thereto, but may be implemented with modifications as appropriate to the extent that the gist thereof is not changed.

First Embodiment

First, a protective element 1A illustrated in, for example, FIGS. 1 to 4 will be described as a first embodiment of the present invention.

Figure 1:
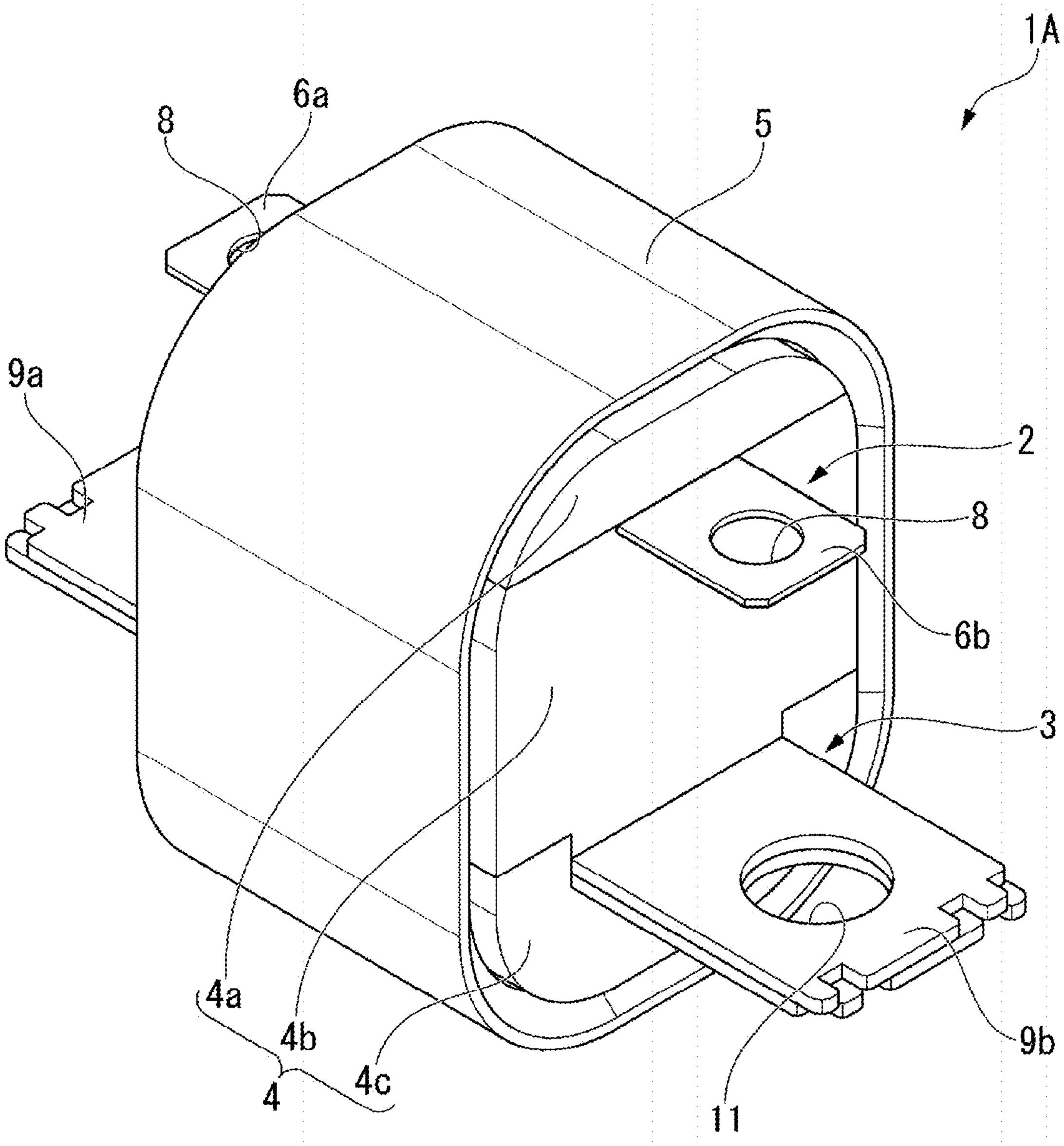
FIG. 1 A perspective view illustrating the appearance of a protective element of a first embodiment of the present invention.
Figure 2:
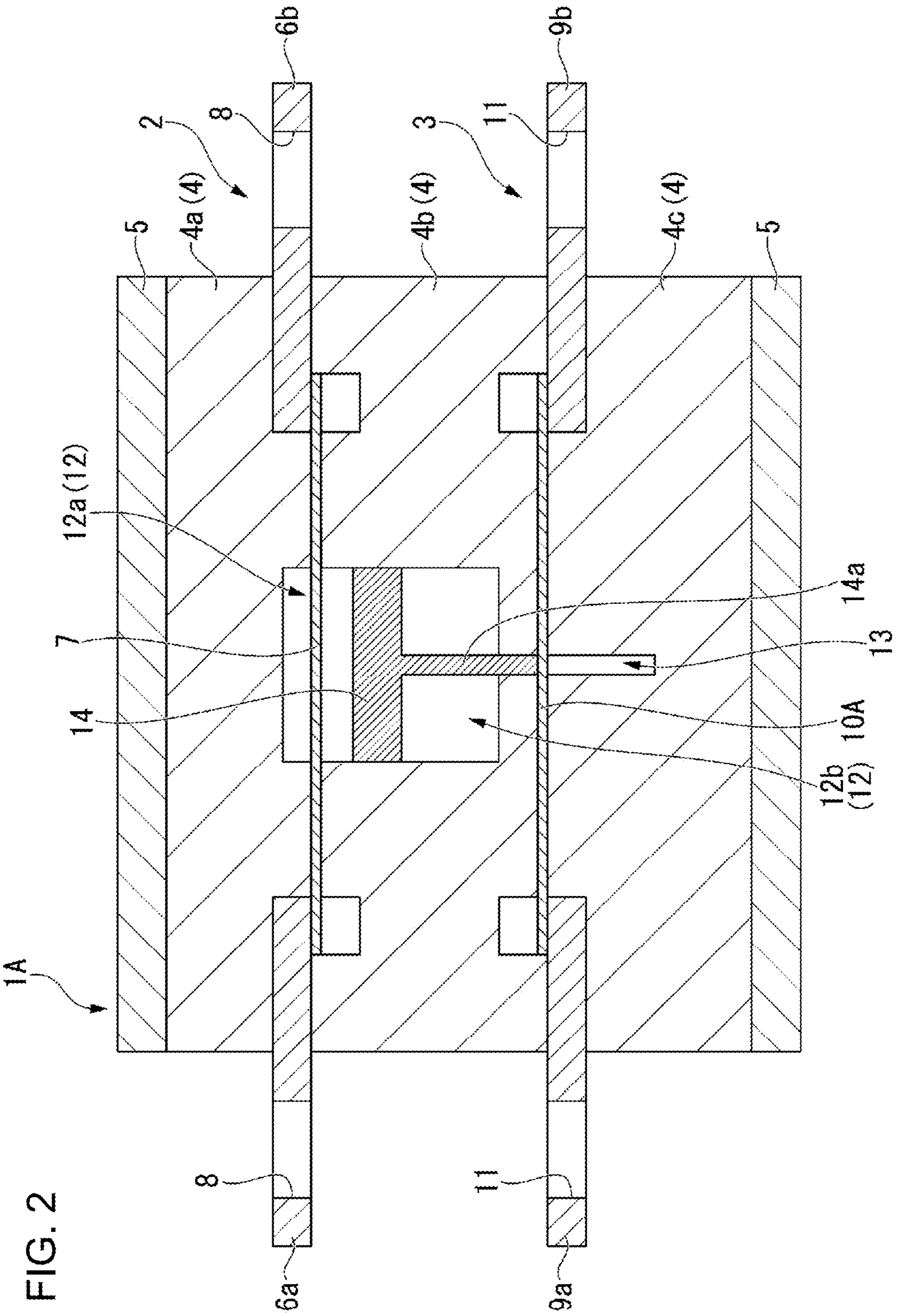
FIG. 2 A cross-sectional view of a configuration of the protective element illustrated in FIG. 1.
Figure 3:
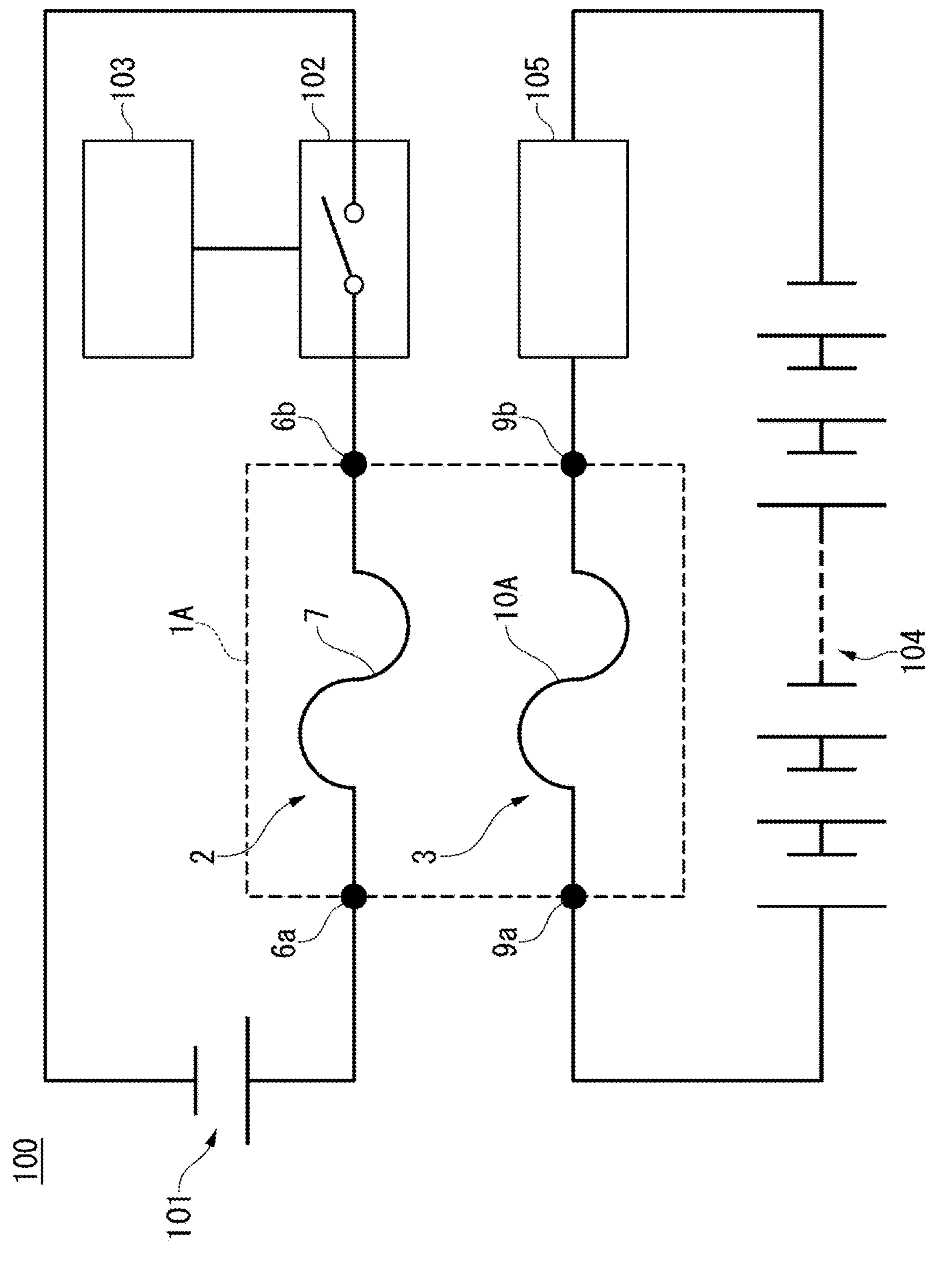
FIG. 3 A circuit diagram illustrating a configuration example of a protective circuit using the protective element illustrated in FIG. 1.
Figure 4:
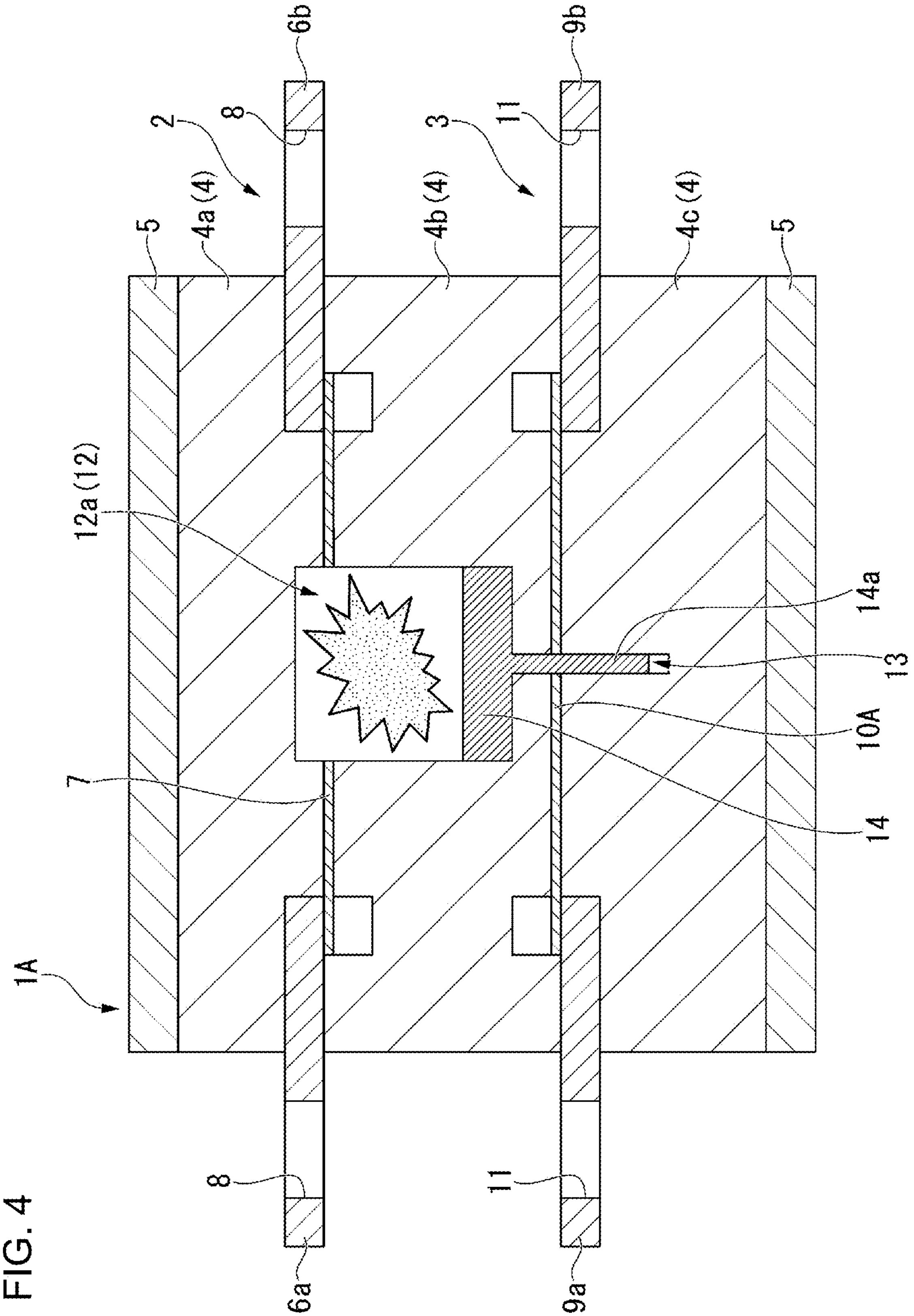
FIG. 4 A cross-sectional view illustrating a state in which the current of the protective element illustrated in FIG. 2 is cut off.

Note that FIG. 1 is a perspective view illustrating the appearance of the protective element 1A. FIG. 2 is a cross-sectional view illustrating a configuration of the protective element 1A. FIG. 3 is a circuit diagram illustrating a configuration example of a protective circuit 100 using the protective element 1A. FIG. 4 is a cross-sectional view illustrating a state in which the current of the protective element 1A is cut off.

As illustrated in FIGS. 1 and 2, the protective element 1A of the present embodiment is provided with a first fuse element part 2 and a second fuse element part 3 parallel to each other, an insulating enclosure 4 that electrically insulates the first fuse element part 2 and the second fuse element part 3 from each other while holding the first fuse element part 2 and the second fuse element part 3, and an insulating cover 5 that houses the insulating enclosure 4 inside.

The first fuse element part 2 has a first terminal 6*a* and a second terminal 6*b*, and a first fuse element 7 that electrically connects the first terminal 6*a* and the second terminal 6*b* to each other.

The first terminal 6*a* and the second terminal 6*b* are, for example, composed of a metal material such as copper (Cu), and are formed into substantially rectangular flat plates. The first terminal 6*a* and the second terminal 6*b* are disposed in a straight line in the same plane in a state in which mutual one end sides (inside the first fuse element part 2) are facing each other.

Furthermore, a terminal hole 8 for external connection is provided opened in a circle on respective other ends of the first terminal 6*a* and the second terminal 6*b* (outside the first fuse element part 2).

The first fuse element 7 is composed of, for example, a metal material such as copper (Cu), silver (Ag), tin (Sn) alloy, lead (Pb) alloy, or a stacked body of tin (Sn) alloy and silver (Ag), and formed into a substantially rectangular flat plate as a fusible conductor.

The first fuse element 7 is installed by soldering, welding, or the like on one surface of the first terminal 6*a* and the second terminal 6*b* (lower surface in the present embodiment) in a state in which the one end side of the first terminal 6*a* and the one end side of the second terminal 6*b* are linked to each other.

The second fuse element part 3 has a third terminal 9*a* and a fourth terminal 9*b*, and a second fuse element 10A that electrically connects the third terminal 9*a* and the fourth terminal 9*b* to each other.

The third terminal 9*a* and the fourth terminal 9*b* are composed of the same material exemplified by the first terminal 6*a* and the second terminal 6*b* described above, and are formed into substantially rectangular flat plates. The third terminal 9*a* and the fourth terminal 9*b* are disposed in a straight line in the same plane in a state in which mutual one end sides (inside the second fuse element part 3) are facing each other.

Furthermore, a terminal hole 11 for external connection is provided opened in a circle on respective other ends of the third terminal 9*a* and the fourth terminal 9*b* (outside the second fuse element part 3).

The second fuse element 10A is composed of, for example, a metal material such as copper (Cu), silver (Ag), tin (Sn) alloy, or lead (Pb) alloy, and formed into a substantially rectangular flat plate as a connecting conductor.

Furthermore, a material having a higher melting point than the first fuse element 7 is used for the second fuse element 10A. For example, in the present embodiment, a stacked body of tin (Sn) alloy and silver (Ag) is used for the first fuse element 7, and copper (Cu) having a higher melting point than the first fuse element 7 is used for the second fuse element 10A.

The second fuse element 10A is installed by soldering, welding, or the like on one surface of the third terminal 9*a* and the fourth terminal 9*b* (upper surface in the present embodiment) in a state in which the one end side of the third terminal 9*a* and the one end side of the fourth terminal 9*b* are linked to each other.

The insulating enclosure 4 has a first case 4*a*, a second case 4*b*, and a third case 4*c* composed of an insulating material described below, and is formed as a whole into an oblong cylinder. Note that the insulating enclosure 4 is not necessarily limited to such a shape, and may be appropriately modified.

Furthermore, the insulating enclosure 4 is configured by assembling the first case 4*a*, the second case 4*b*, and the third case 4*c* into one body in a state in which the first fuse element part 2 is interposed between the first case 4*a* and the second case 4*b* and the second fuse element part 3 is interposed between the second case 4*b* and the third case 4*c*.

Thus, the insulating enclosure 4 holds the first fuse element part 2 and the second fuse element part 3 and electrically insulates the first fuse element part 2 and the second fuse element part 3 from each other in a state in which the other ends of the first terminal 6*a* and the second terminal 6*b* and the other ends of the third terminal 9*a* and the fourth terminal 9*b* are exposed to the exterior from both ends of the axial direction of the insulating enclosure 4.

A fusing space 12 in which the first fuse element 7 is positioned and a cutting space 13 in which the second fuse element 10A is provided on the interior of the insulating enclosure 4. Furthermore, a slider 14 is disposed in the fusing space 12. Moreover, the fusing space 12 is divided into a first space 12*a* and a second space which interpose the slider 14, the first fuse element 7 is positioned in the first space, and a second space 12*b* connected to the cutting space 13.

The fusing space 12 forms a space orthogonal to the axial direction of the insulating enclosure 4 spanning between the first case 4*a* and the second case 4*b* so as to be positioned at a middle of the first fuse element 7. A shape of the fusing space 12 is not particularly limited, and may be, for example, a circular cylinder or a rectangular shape.

The cutting space 13 forms a slit-shaped space orthogonal to the axial direction of the insulating enclosure 4 spanning between the second case 4*b* and the third case 4*c* so as to be positioned at a middle of the second fuse element 10A. Note that a position of the cutting space 13 is not limited to the middle of the second fuse element 10A described above, and may be, for example, a position shifted to the third terminal 9*a* side.

On the other hand, the slider 14 is composed of an insulating material such as a nylon, Teflon (registered trademark), LCP, or the like, and is formed into a plate thinner than the fusing space 12. Furthermore, the slider 14 may be a metal or the like whose surface has been insulation treated. Specifically, for example, an aluminum alloy material having an anodized surface may be used.

The slider 14 is positioned between the first fuse element 7 (first space 12*a*) and the second fuse element 10A (second space 12*b*) of the fusing space 12 and is disposed within the fusing space 12. Thus, the slider 14 is disposed to be movable within the fusing space 12 toward the second fuse element 10A side (lower side in the present embodiment).

Furthermore, the slider 14 has a rectangular flat plate cutting part 14*a* protruding from a surface opposite the second space 12*b* thereof (lower surface in the present embodiment). The cutting part 14*a* abuts the second fuse element 10A by being extended from the second space 12*b* toward the cutting space 13, and a leading edge thereof being inserted into the cutting space 13.

The insulating cover 5 is composed of an insulating material, described below, and has a shape that covers an entire outer circumference surface of the insulating enclosure 4. By seamlessly covering the entire circumference of the insulating enclosure 4, the insulating cover 5 is able to prevent breakdown of the insulating enclosure 4 due to arc discharge during fusion of the first fuse element 7, described below.

Incidentally, the insulating enclosure 4 and the insulating cover 5 are preferably formed by an insulating material having a comparative tracking index CTI (resistance to tracking (carbonized conduction path) breakdown) of 500V or higher. Note that the comparative tracking index CTI may be found by testing based on IEC 60112.

Specifically, it is preferable to use a resin material having a lower thermal capacity and lower melting point than ceramic materials as an insulating material for the insulating enclosure 4 and insulating cover 5. Furthermore, the resin material has a property of weakening arc discharge due to gasification cooling (ablation) and a property wherein melted and scattered metal particles of the first fuse element 7, when adhering to the insulating enclosure 4, become sparse and do not easily form a conductive path due to the surface of the insulating cover 5 deforming and adherents agglutinating.

As specific examples of resin materials, a polyamide resin or fluorine resin may be used. Polyamide resins may be aliphatic polyamides or semi-aromatic polyamides.

Examples of aliphatic polyamides include nylon 4, nylon 6, nylon 46, and nylon 66. Examples of semi-aromatic polyamides include nylon 6T, nylon 9T, and polyphthalamide (PPA) resins. Examples of fluorine resins include polytetrafluoroethylene. Furthermore, polyamide and fluorine resins have high heat resistance and are difficult to burn.

In particular, aliphatic polyamides are less likely to produce graphite when burned. Therefore, by using an aliphatic polyamide to form the insulating enclosure 4 and insulating cover 5, it is possible to more reliably prevent new current paths from being formed by graphite generated by arc discharge during fusion of the first fuse element 7, described below.

The protective element 1A of the present embodiment having the configuration described above is suitable for use in, for example, the protective circuit 100 illustrated in FIG. 3. Specifically, in this protective circuit 100, an auxiliary power supply 101 is connected to the one end side of the first fuse element part 2, which serves as a sub-fuse, and a current detection circuit 103 is connected to the other end side of the first fuse element part 2 via a switch 102.

On the other hand, in the protective circuit 100, a main power supply 104 is connected to the one end side of the second fuse element part 3, which serves as a main fuse, and a load circuit 105 is connected to the other end side of the second fuse element part 3.

In the protective circuit 100, when the current detection circuit 103 detects an abnormality caused by damage to equipment on which the main power supply is mounted, for example, in an electric vehicle (EV) accident, the current detection circuit 103 supplies a cutoff signal to the switch 102, turning on (ON) the switch 102, thereby supplying a fusion current from the auxiliary power supply 101 to the first fuse element part 2.

Here, the fusion current is a current large enough to fuse the first fuse element 7. On the other hand, the fusion current is smaller than the rated current flowing in the second fuse element part 3.

In the protective element 1A of the present embodiment, as illustrated in FIG. 4, when the fusion current is supplied to the first fuse element part 2, the fusion current flows to the first fuse element 7, causing the first fuse element 7 to fuse, and an arc discharge to occur within the first space 12*a*.

At this time, a portion of the fused first fuse element 7 vaporizes and the gas (for example, air) in the first space 12*a* expands, whereby the pressure in the first space 12*a* increases. Moreover, as the pressure in the first space 12*a* increases, the slider 14 moves toward the second fuse element 10A side.

This causes the leading edge of the cutting part 14*a* to physically cut the second fuse element 10A. Furthermore, after the cutting part 14*a* cuts the second fuse element 10A, the cutting part 14*a* shields the cut portion of the second fuse element 10A within the cutting space 13.

As a result, in the protective circuit 100, the supply of power from the main power supply 104 to the load circuit 105 is completely cut off.

Furthermore, in the protective element 1A of the present embodiment, when an overcurrent flows in the second fuse element part 3, which is the main fuse, the overcurrent causes the second fuse element 10A to fuse, thereby cutting off the supply of power from the main power supply 104 to the load circuit 105.

As described above, in the protective element 1A of the present embodiment, it is possible to handle high voltages and large currents, and to achieve both cutoff of overcurrent and a cutoff function by a cutoff signal.

Second Embodiment

Next, a protective element 1B illustrated in, for example, FIGS. 5 and 6 will be described as a second embodiment of the present invention.

Figure 5:
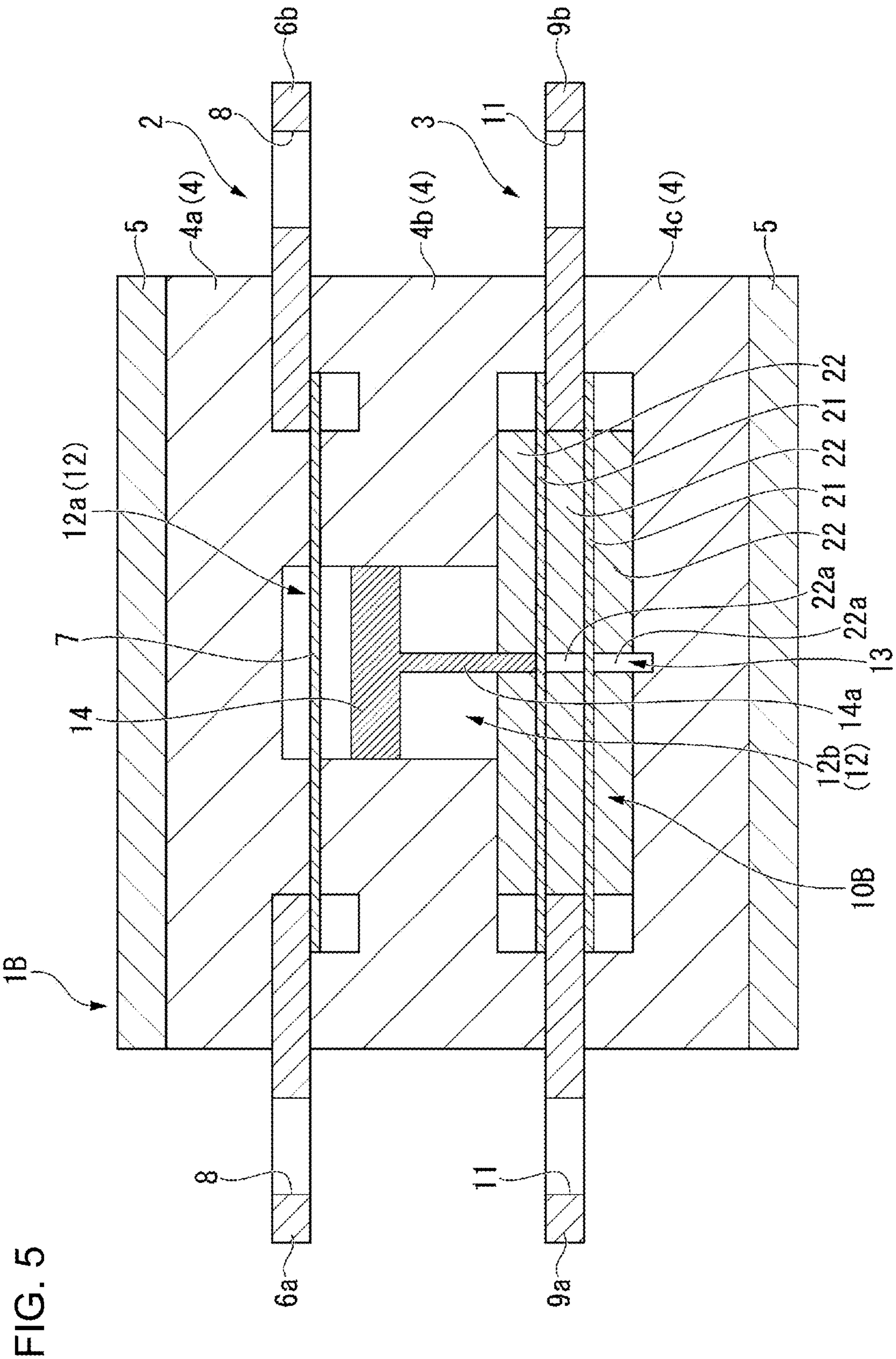
FIG. 5 A cross-sectional view illustrating a configuration of a protective element of a second embodiment of the present invention.

Note that FIG. 5 is a cross-sectional view illustrating a configuration of the protective element 1B. FIG. 6 is a cross-sectional view illustrating a state in which the current of the protective element 1B is cut off. Furthermore, in the following description, for parts which are equivalent to the above protective element 1A, description is omitted and the same reference signs are used in the drawings.

Other than being provided with a second fuse element 10B as illustrated in, for example, FIG. 5 instead of the second fuse element 10A above, the protective element 1B of the present embodiment has basically the same configuration as the protective element 1A above.

Specifically, this second fuse element 10B has a structure in which a plurality of a conductive member 21 is stacked via an insulating member 22. In the present embodiment, two conductive members 21 are disposed in a state interposed between each of three insulating members 22.

The conductive member 21 is composed of the same connecting conductor as the material exemplified in the second fuse element 10A above. The two conductive members 21 are respectively installed by welding, soldering, or the like on the one surface (upper surface in the present embodiment) and the other surface (lower surface in the present embodiment) of the third terminal 9*a* and the fourth terminal 9*b* in a state in which the one end side of the third terminal 9*a* and the one end side of the fourth terminal 9*b* are linked to each other.

The insulating member 22 similarly to, for example, the insulating enclosure 4 and the insulating cover 5 above, is preferably formed by an insulating material having a comparative tracking index CTI (resistance to tracking (carbonized conduction path) breakdown) of 500 V or higher. Specifically, an insulating material such as a nylon or Teflon may be used.

Furthermore, each insulating member 22 is provided with a gap part 22*a* corresponding to the cutting space 13 above. That is, this gap part 22*a* is formed by removing a portion of each insulating member 22 corresponding to the cutting space 13 above.

The cutting part 14*a* is extended from the second space 12*b* toward the cutting space 13, and a leading edge thereof is inserted into the gap part 22*a* (cutting space 13). The leading edge of the cutting part 14*a* may abut the conductive member 21 installed on one surface (for example, the upper surface) of the third terminal 9*a* and the fourth terminal 9*b*.

The protective element 1B of the present embodiment having the configuration described above, similarly to the protective element 1A above, is suitable for use in the protective circuit 100 above.

Figure 6:
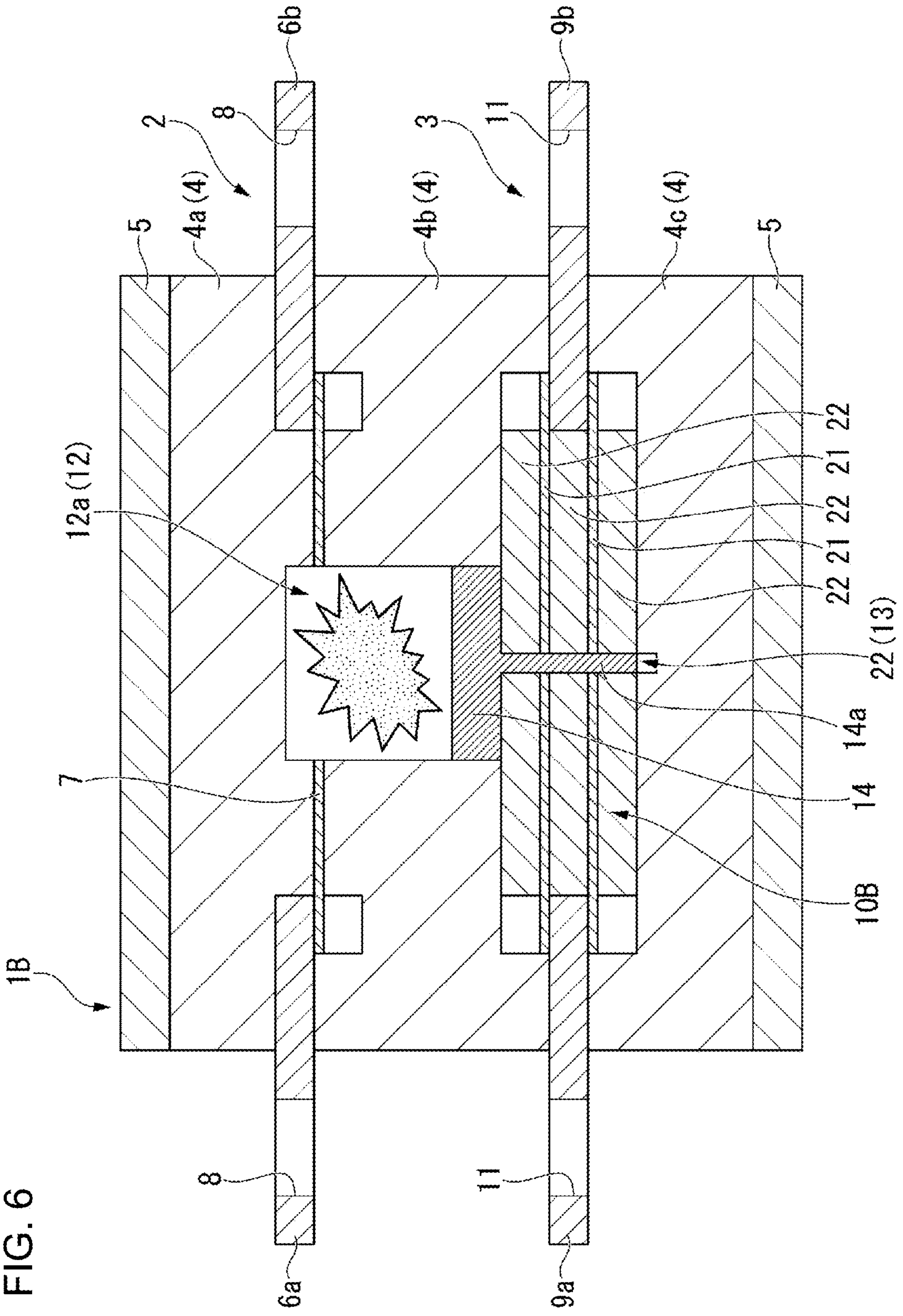
FIG. 6 A cross-sectional view illustrating a state in which the current of the protective element illustrated in FIG. 5 is cut off.

Therefore, in the protective element 1B of the present embodiment, as illustrated in FIG. 6, when the fusion current is supplied to the first fuse element part 2 by a cutoff signal, the fusion current flows to the first fuse element 7, causing the first fuse element 7 to fuse, and an arc discharge to occur within the first space 12*a*.

At this time, a portion of the fused first fuse element 7 vaporizes and the gas (for example, air) in the first space 12*a* expands, whereby the pressure in the first space 12*a* increases. Moreover, as the pressure in the first space 12*a* increases, the slider 14 moves toward the second fuse element 10B side.

This causes the leading edge of the cutting part 14*a* to physically cut each conductive member 21 of the second fuse element 10B. Furthermore, after the cutting part 14*a* cuts each conductive member 21 of the second fuse element 10B, the cutting part 14*a* shields the cut portion of the second fuse element 10B within the gap part 22*a* (cutting space 13).

As a result, in the protective circuit 100, the supply of power from the main power supply 104 to the load circuit 105 is completely cut off.

As described above, in the protective element 1B of the present embodiment, it is possible to handle high voltages and large currents, and to achieve both cutoff of overcurrent and a cutoff function by a cutoff signal.

Furthermore, in the protective element 1B of the present embodiment, it is possible to raise the rated current flowing in the second fuse element 10B higher than the second fuse element 10A above by configuring the second fuse element 10B above using the plurality of conductive members 21.

Third Embodiment

Next, a protective element 1C illustrated in, for example, FIG. 7 will be described as a third embodiment of the present invention.

Figure 7:
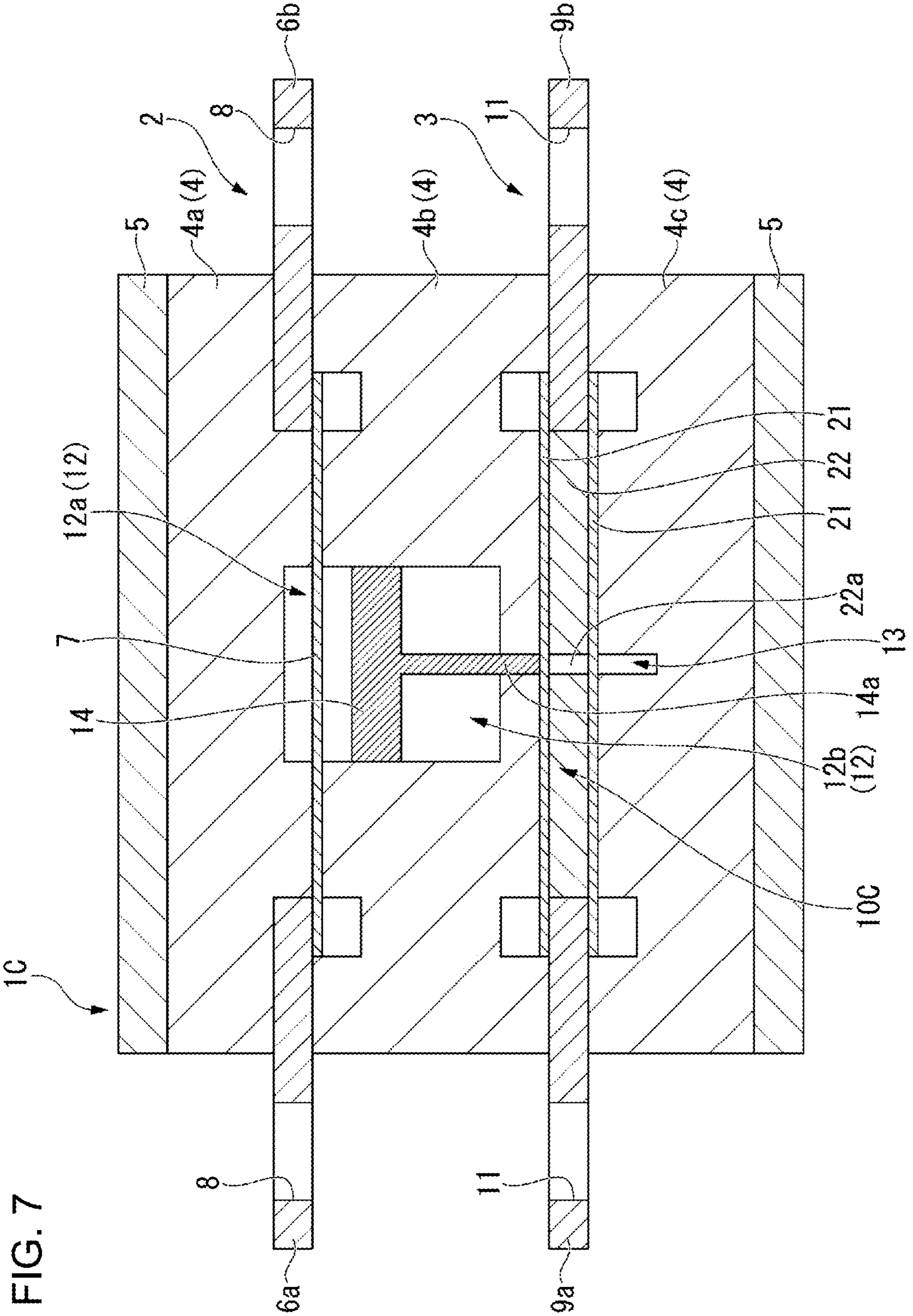
FIG. 7 A cross-sectional view illustrating a configuration of a protective element for a third embodiment of the present invention.

Note that FIG. 7 is a cross-sectional view illustrating a configuration of the protective element 1C. Furthermore, in the following description, for parts which are equivalent to the above protective elements 1A, 1B, description is omitted and the same reference signs are used in the drawings.

Other than being provided with a second fuse element 10C as illustrated in, for example, FIG. 7 instead of the second fuse elements 10A, 10B above, the protective element 1C of the present embodiment has basically the same configuration as the protective elements 1A, 1B above.

Specifically, this second fuse element 10C has a structure in which a plurality of a conductive member 21 is stacked via an insulating member 22. In the present embodiment, one insulating member 22 is disposed in a state interposed between two conductive member 21.

The protective element 1C of the present embodiment having the configuration described above, similarly to the protective elements 1A and 1B above, is suitable for use in the protective circuit 100 above.

Therefore, in the protective element 1C of the present embodiment, although illustration is omitted, when the fusion current is supplied to the first fuse element part 2 by a cutoff signal, the fusion current flows to the first fuse element 7, causing the first fuse element 7 to fuse, and an arc discharge to occur within the first space 12*a*.

At this time, a portion of the fused first fuse element 7 vaporizes and the gas (for example, air) in the first space 12*a* expands, whereby the pressure in the first space 12*a* increases. Moreover, as the pressure in the first space 12*a* increases, the slider 14 moves toward the second fuse element 10C side.

This causes the leading edge of the cutting part 14*a* to physically cut each conductive member 21 of the second fuse element 10C. Furthermore, after the cutting part 14*a* cuts each conductive member 21 of the second fuse element 10C, the cutting part 14*a* shields the cut portion of the second fuse element 10C within the gap part 22*a* (cutting space 13).

As a result, in the protective circuit 100, the supply of power from the main power supply 104 to the load circuit 105 is completely cut off.

As described above, in the protective element 1C of the present embodiment, it is possible to handle high voltages and large currents, and to achieve both cutoff of overcurrent and a cutoff function by a cutoff signal.

Furthermore, in the protective element 1C of the present embodiment, it is possible to raise the rated current flowing in the second fuse element 10C higher than the second fuse element 10A above by configuring the second fuse element 10C above using the plurality of conductive members 21.

Fourth Embodiment

Next, a protective element 1D illustrated in, for example, FIG. 8 will be described as a fourth embodiment of the present invention.

Figure 8:
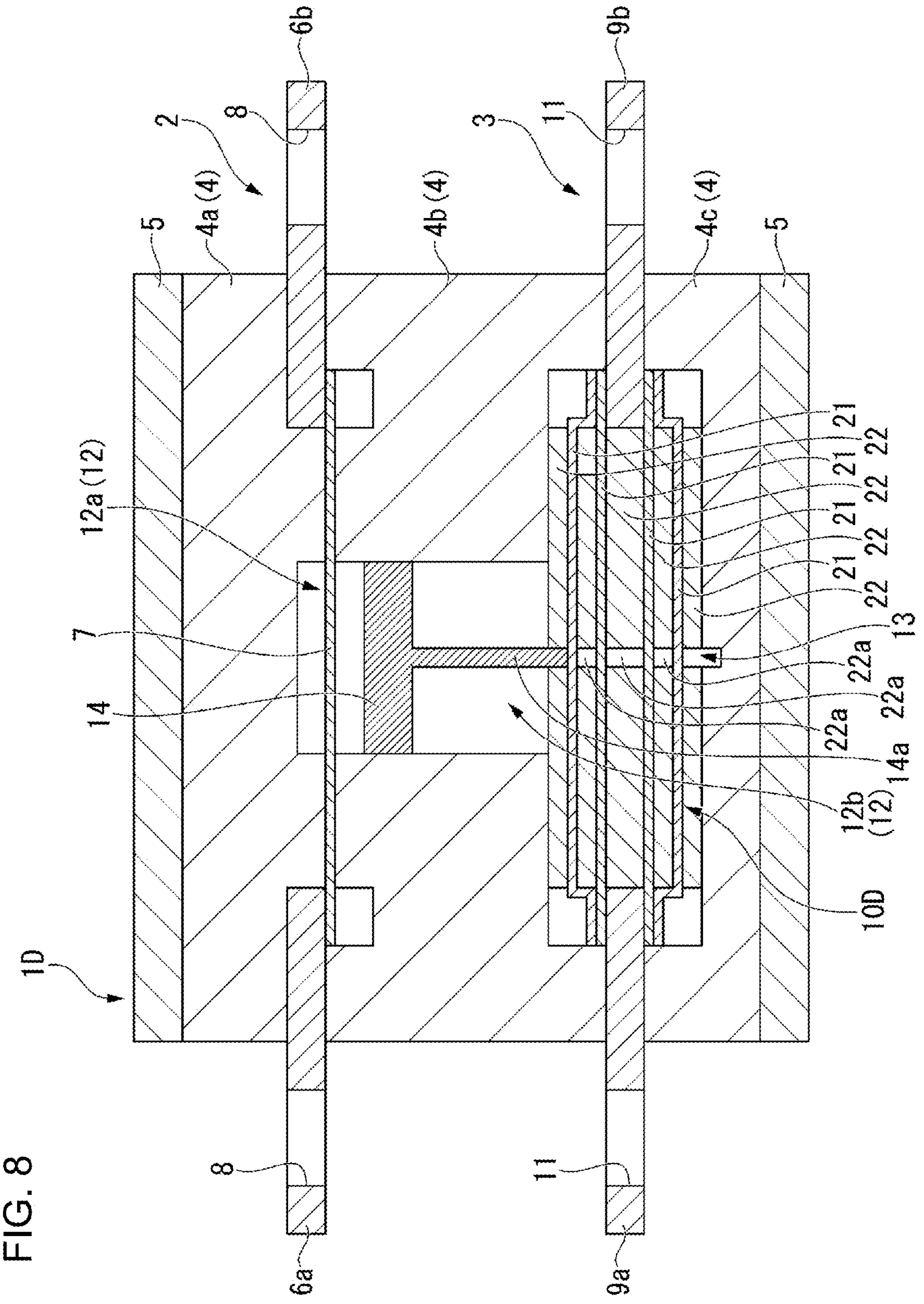
FIG. 8 A cross-sectional view illustrating a configuration of a protective element of a fourth embodiment of the present invention.

Note that FIG. 8 is a cross-sectional view illustrating a configuration of the protective element 1D. Furthermore, in the following description, for parts which are equivalent to the above protective elements 1A, 1B, description is omitted and the same reference signs are used in the drawings.

Other than being provided with a second fuse element 10D as illustrated in, for example, FIG. 8 instead of the second fuse elements 10A and 10B above, the protective element 1D of the present embodiment has basically the same configuration as the protective elements 1A, 1B above.

Specifically, this second fuse element 10D has a structure in which a plurality of a conductive member 21 is stacked via an insulating member 22. In the present embodiment, four conductive members 21 are disposed in a state interposed between each of five insulating members 22.

The four conductive members 21 are respectively installed by welding, soldering, or the like on the one surface (upper surface in the present embodiment) and the other surface (lower surface in the present embodiment) of the third terminal 9*a* and the fourth terminal 9*b* in a state in which the one end side of the third terminal 9*a* and the one end side of the fourth terminal 9*b* are linked to each other.

The protective element 1D of the present embodiment having the configuration described above, similarly to the protective elements 1A and 1B above, is suitable for use in the protective circuit 100 above.

Therefore, in the protective element 1D of the present embodiment, although illustration is omitted, when the fusion current is supplied to the first fuse element part 2 by a cutoff signal, the fusion current flows to the first fuse element 7, causing the first fuse element 7 to fuse, and an arc discharge to occur within the first space 12*a*.

At this time, a portion of the fused first fuse element 7 vaporizes and the gas (for example, air) in the first space 12*a* expands, whereby the pressure in the first space 12*a* increases. Moreover, as the pressure in the first space 12*a* increases, the slider 14 moves toward the second fuse element 10D side.

This causes the leading edge of the cutting part 14*a* to physically cut each conductive member 21 of the second fuse element 10D. Furthermore, after the cutting part 14*a* cuts each conductive member 21 of the second fuse element 10D, the cutting part 14*a* shields the cut portion of the second fuse element 10D within the gap part 22*a* (cutting space 13).

As a result, in the protective circuit 100, the supply of power from the main power supply 104 to the load circuit 105 is completely cut off.

As described above, in the protective element 1D of the present embodiment, it is possible to handle high voltages and large currents, and to achieve both cutoff of overcurrent and a cutoff function by a cutoff signal.

Furthermore, in the protective element 1D of the present embodiment, it is possible to raise the rated current flowing in the second fuse element 10D higher than the second fuse element 10A above by configuring the second fuse element 10D above using the plurality of conductive members 21.

Furthermore, the second fuse element 10D, like the second fuse element 10C of the third embodiment above, may omit the insulating members 22 of the top and bottom layers and interpose the conductive members 21 of the top and bottom layers between the second case 4*b* and third case 4*c*.

Fifth Embodiment

Next, a protective element 1E illustrated in, for example, FIGS. 9A and 9B will be described as a fifth embodiment of the present invention.

Figure 9A:
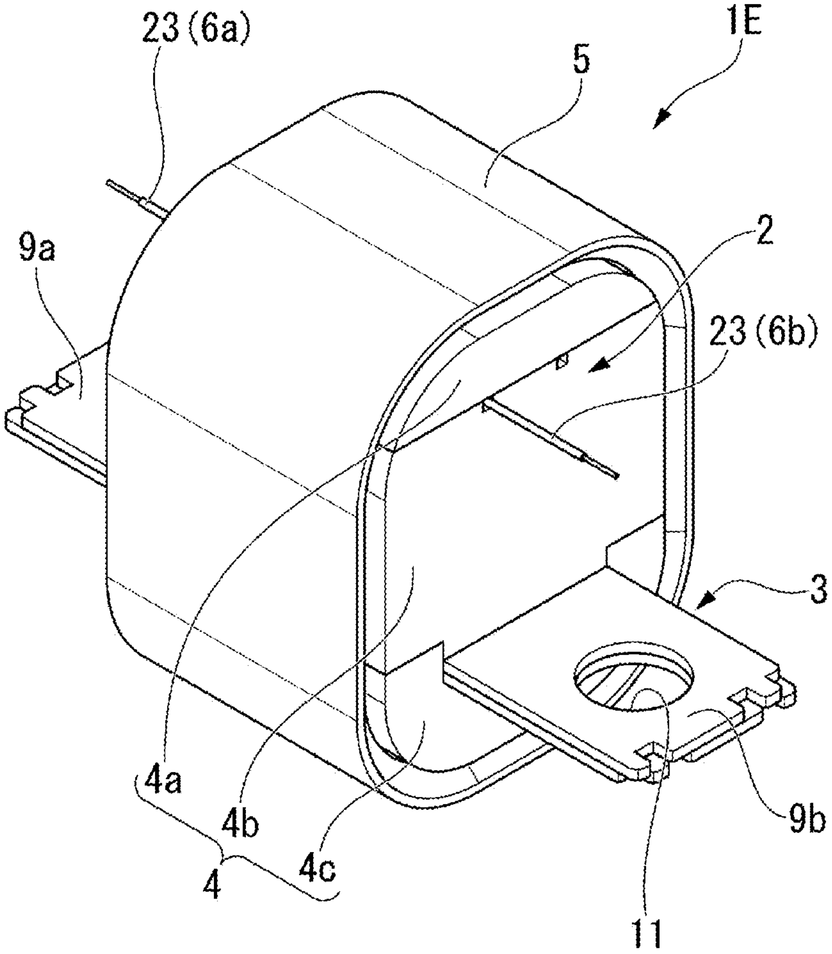
FIG. 9*a* A perspective view illustrating one example of a configuration of a protective element of the fifth embodiment of the present invention.

Note that FIG. 9A is a perspective view illustrating one example of a configuration of the protective element 1E. FIG. 9B is a perspective view illustrating another example of a configuration of the protective element 1E. Furthermore, in the following description, for parts which are equivalent to the above protective elements 1A to 1D, description is omitted and the same reference signs are used in the drawings.

Figure 9B:
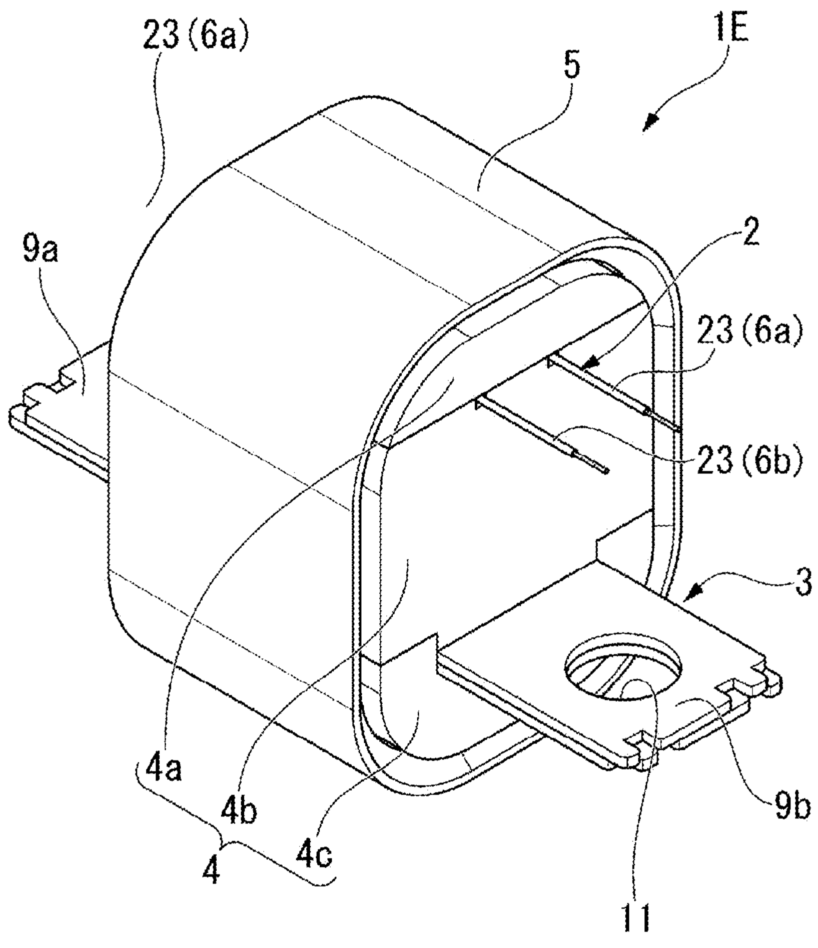
FIG. 9*b* A perspective view illustrating another example of a configuration of a protective element of the fifth embodiment of the present invention.

Among the configurations of the above protective elements 1A to 1D, other than using a lead terminal 23 as illustrated in, for example, FIGS. 9A and 9B as the first terminal 6*a* and the second terminal 6*b*, the protective element 1E of the present embodiment has basically the same configuration as the above protective elements 1A to 1D.

Specifically, this lead terminal 23 is composed of an electric wire coated by an insulating resin and, in a state connected to both ends of the first fuse element 7, is extracted from both end sides of the axial direction of the insulating enclosure 4 illustrated in FIG. 9A or from the one end side of the axial direction of the insulating enclosure 4 illustrated in FIG. 9B.

The protective element 1E of the present embodiment having the configuration described above, similarly to the protective elements 1A to 1D above, is suitable for use in the protective circuit 100 above.

Therefore, in the protective element 1E of the present embodiment, it is possible to handle high voltages and large currents, and to achieve both cutoff of overcurrent and a cutoff function by a cutoff signal.

Note that the present invention is not necessarily limited to the above embodiments, and various changes may be made within a scope that does not deviate from the spirit of the present invention.

For example, the fusing space 12 and the slider 14 are not necessarily limited to the shapes described above, so long as the slider 14 is movable within the fusing space 12. Furthermore, the cutting space 13 and the cutting part 14*a* are not necessarily limited to the shapes described above, so long as the shapes are such that the second fuse elements 10A to 10E are physically cuttable by the leading edge of the cutting part 14*a*.

INDUSTRIAL APPLICABILITY

According to the present invention, it is possible to handle high voltages and large currents, and to provide a protective element capable of achieving both cutoff of overcurrent and a cutoff function by a cutoff signal.

DESCRIPTION OF REFERENCE SIGNS

1A to 1E . . . Protective element, 2 . . . First fuse element part, 3 . . . Second fuse element part, 4 . . . Insulating enclosure, 5 . . . Insulating cover, 6*a* . . . First terminal, 6*b* . . . Second terminal, 7 . . . First fuse element, 8 . . . Terminal hole, 9*a* . . . Third terminal, 9*b* . . . Fourth terminal, 10A to 10D . . . Second fuse element, 11 . . . Terminal hole, 12 . . . Fusing space, 12*a* . . . First space, 12*b* . . . Second space, 13 . . . Cutting space, 14 . . . Slider, 14*a* . . . Cutting part, 21 . . . Conductive member, 22 . . . Insulating member, 23 . . . Lead terminal, 100 . . . Protective circuit

The invention claimed is:

1. A protective element comprising:

a first fuse element part comprising a first terminal, a second terminal, and a first fuse element electrically connecting the first terminal and the second terminal to each other;

a second fuse element part comprising a third terminal, a fourth terminal and a second fuse element electrically connecting the third terminal and the fourth terminal to each other;

an insulating enclosure having a fusing space in which the first fuse element is positioned and a cutting space in which the second fuse element is positioned, the insulating enclosure electrically insulating the first fuse element part and the second fuse element part from each other while holding the first fuse element part and the second fuse element part; and a slider positioned between the first fuse element and the second fuse element, and disposed to be movable within the fusing space toward a second fuse element side, wherein the fusing space is divided into a first space and a second space which interpose the slider, the first fuse element being positioned in the first space, and a second space being connected to the cutting space, the slider has a cutting part protruding from the second space toward the cutting space, and when a fusion current flows to the first fuse element, causing the first fuse element to fuse, an arc discharge occurs within the first space, and as pressure in the first space rises, the slider is configured to move toward a second fuse element side such that the cutting part cuts the second fuse element.

2. The protective element according to claim 1, wherein, after the cutting part has cut the second fuse element, the cutting part is configured to shield a cut portion of the second fuse element within the cutting space.

3. The protective element according to claim 1, wherein the second fuse element has a structure in which a plurality of a conductive member is stacked via an insulating member, and the insulating member is provided with a gap part at a position corresponding to the cutting space.

4. The protective element according to claim 1, further comprising a cylindrical insulating cover that houses the insulating enclosure inside.

5. The protective element according to claim 1, wherein a melting point of the second fuse element is higher than a melting point of the first fuse element.

6. The protective element according to claim 2, wherein the second fuse element has a structure in which a plurality of a conductive member is stacked via an insulating member, and the insulating member is provided with a gap part at a position corresponding to the cutting space.

7. The protective element according to claim 2, further comprising a cylindrical insulating cover that houses the insulating enclosure inside.

8. The protective element according to claim 2, wherein a melting point of the second fuse element is higher than a melting point of the first fuse element.

* * * * *